United States Patent [19]
Williams

[11] Patent Number: 4,770,487
[45] Date of Patent: Sep. 13, 1988

[54] OPTICAL FIBER CONNECTION ASSEMBLY

[75] Inventor: Russell H. Williams, Flemington, N.J.

[73] Assignee: Thomas & Betts Corporation, Bridgewater, N.J.

[21] Appl. No.: 830,612

[22] Filed: Feb. 18, 1986

Related U.S. Application Data

[63] Continuation of Ser. No. 527,438, Aug. 29, 1983, abandoned.

[51] Int. Cl.$^4$ .................................................. G02B 6/36
[52] U.S. Cl. ................................. 350/96.20; 350/96.10
[58] Field of Search ................. 350/96.20, 96.21, 96.22

[56] References Cited

U.S. PATENT DOCUMENTS

| | | | |
|---|---|---|---|
| 3,951,514 | 4/1976 | Medina, Jr. | 350/96 C |
| 3,982,815 | 9/1976 | Nakayama | 350/96 C |
| 4,218,113 | 8/1980 | Uberbacher | 350/96.21 |
| 4,229,068 | 10/1980 | Hodge et al. | 350/96.20 |
| 4,261,642 | 4/1981 | Lewis et al. | 350/96.20 |
| 4,303,304 | 12/1981 | Ruiz | 350/96.20 |
| 4,362,356 | 12/1982 | Williams et al. | 350/96.20 |
| 4,368,948 | 1/1983 | Despouys | 350/96.20 |
| 4,418,983 | 12/1983 | Bowen et al. | 350/96.21 |
| 4,448,481 | 5/1984 | Basov et al. | 350/96.20 |

FOREIGN PATENT DOCUMENTS

| | | |
|---|---|---|
| 0076513 | 4/1983 | European Pat. Off. |
| 56-50308 | 7/1981 | Japan |
| 57-188005 | 11/1982 | Japan |

OTHER PUBLICATIONS

Institute of Radio Engineering & Electronics, Academy of Sciences of the USSR, Moscow, Jul.-Aug. 1979, pp. 277-278.
OFTI 400-NE and 200-S-NE Series SMA Style-Single Channel Single Fiber Connectors, undated.
UV-curable adhesive bonds optical fiber to connector-Design News-12/6/82 pp. 60-61.

Primary Examiner—William L. Sikes
Assistant Examiner—Akm E. Ullah
Attorney, Agent, or Firm—Robert M. Rodrick; Salvatore J. Abbruzzese

[57] ABSTRACT

A fiber optic connector including a fiber securing ferrule which permits fiber cleaving therein. The ferrule includes a slot through its outer surface and internally of the end wall thereof to permit cleaving at a point recessed from the wall. The cleaved fiber end face is positioned within the ferrule thus providing protection thereto.

5 Claims, 3 Drawing Sheets

OPTICAL FIBER CONNECTION ASSEMBLY

The present application is a continuation to application Ser. No. 527,438, filed 8/29/83, now abandoned, and claim is made to the benefit of the filing date of such application pursuant to 35 U.S.C. 120.

FIELD OF THE INVENTION

The present invention relates generally to optical fiber connectors and more particularly to a device for securing a fiber in a connector and accessing the fiber for cleaving purposes.

BACKGROUND OF THE INVENTION

The use of optical fibers for light transmission has become inreasingly popular especially in the area of data, telephone and other types of communication networks.

Optical fibers are typically contained in a fiber optic cable which comprises an outer jacket and one or more optical fibers extending therethrough. Stranded strengthening members are positioned between the fiber and the jacket to provide tensile support to the fiber in the jacket. When terminating an optical cable for use in a connector or similar terminating device, a length of fiber is exposed from the jacket. The fiber end is then cleaved leaving a suitably prepared optical end face. The fiber is then placed in the connector for ultimate connection with another fiber or other optical device.

As the optical fiber is very thin, and in be case of glass fiber very brittle, it is desirable to cleave the fiber after the fiber has been secured in the connector. This would eliminate possible damage to the cleaved and prepared fiber while positioning the fiber in the connector. One significant disadvantage of cleaving in the connector is that a small portion of the fiber would remain external of the connector. This results in greater complexity is designing an optical connector as the device must accommodate and protect extending end of the fiber.

Techniques are known which strive to cleave the fiber at a point internal of the end face of the connecting device. These techniques include providing a connecting device with a dish-shaped end. A cleaving device can be brought down at an angle from a position external of the dish to contact the fiber internally of the end face of the dish. While thus providing a cleave internally of the connector end face, this dish-type configuration has certain disadvantages. It is more difficult to design a mechanism which will move a cleaving element through the critical angle needed to clear the dished end of the connector and yet contact the fiber at the appropriate point. Further, striking the fiber at an angle tends to reduce the life of the cleaving element as a result of uneven vector forces working against the cleaving element. In addition as the cleaving element will strike the fiber at an angle there is a tendency for the cleaving element to slide along the length of the fiber resulting in an ineffective cleave.

It is desirable to provide an optical fiber connecting device that will permit fiber cleaving internally of the end face thereof. The device should securely retain the fiber therein and provide ready access to a conventional cleaving device.

SUMMARY OF THE INVENTION

It is a general object of the present invention to provide a fiber optic connecting device which secures a fiber therein and accesses the fiber for cleaving purposes.

It is a particular object of the present invention to provide a ferrule for securing a fiber therein and providing access for cleaving the fiber internally of the end face of the ferrule.

The invention looks toward providing a connector housing which supports therein a fiber accommodating ferrule. The ferrule includes a fiber accessing opening which provides for cleaving the fiber internally of the end face of the ferrule.

In a particularly described embodiment a plug and receptacle are provided each supporting a pair of ferrules, each for accommodating a pair of optical fibers. The ferrules include an exteriorally accessable opening which is in communication with the fiber bore in the ferrules to provide cleaving access internally of the end faces of the ferrule. The fibers are secured in the ferrule by the adhesive material placed around the fiber.

DETAILED DESCRIPTION OF THE PREFERRED EMBODIMENT

Figure 1:
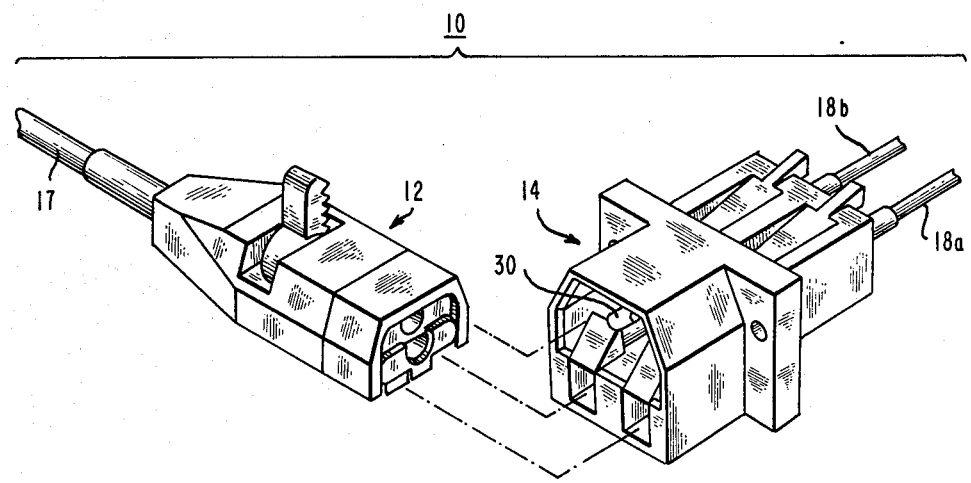
FIG. 1 shows in perspective view the fiber optic connection assembly of the present invention with the plug and receptacle shown disconnected.

Referring to FIG. 1, a fiber optic connection assembly 10 is shown comprising a male plug 12 and a female receptacle 14. In preferred form the male/female connection assembly 10 is a duplex assembly for connecting two pairs of optical fibers. The male plug 12 accommodates a pair of fibers 16 (FIG. 3) in a single cable 17, and the female receptacle 14 accommodates separate fiber optic cables 18a and 18b. It is however within the contemplation of the present invention to provide a connector for single as well as plural optical fibers.

Figure 2:
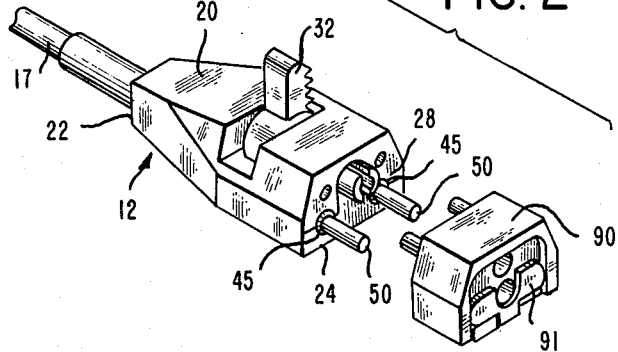
FIG. 2 shows in perspective view the plug of the assembly of FIG. 1 with the shutter mechanism shown removed therefrom.
Figure 3:
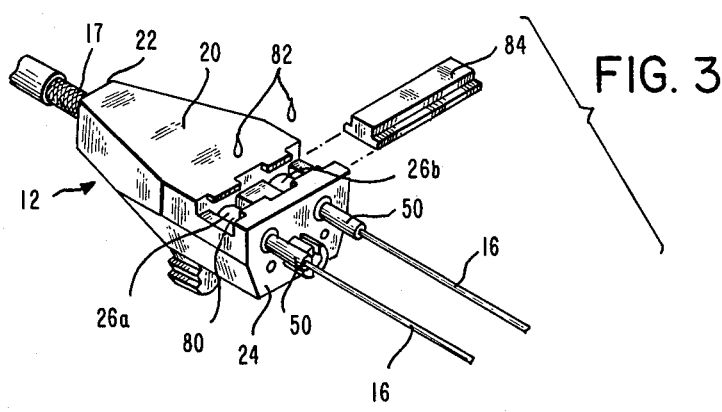
FIG. 3 shows the underside of the plug of FIG. 2 with the adhesive well cover removed.

Additionally referring to FIGS. 2 and 3, plug 12 is shown comprising a housing 20, typically formed of plastic, having a tapered cable receiving end portion 22 and a wider fiber egressing portion 24 opposite end portion 22. A central bore (not shown) extends from tapered end portion 22 through housing 20, and branches into a pair of fiber bores 26a, 26b which allow passage of the duplex fiber optic cable 17. Housing 20 further includes a lock member 28 which in the present embodiment is a female bayonet-type lock engageable with male bayonett lock 30 of female receptacle 14. Bayonet lock 28 is activated by latch 32 for securing plug 12 to receptacle 14. The bayonet-arrangement is shown by way of example and any conventional locking means can be employed.

Figure 5:
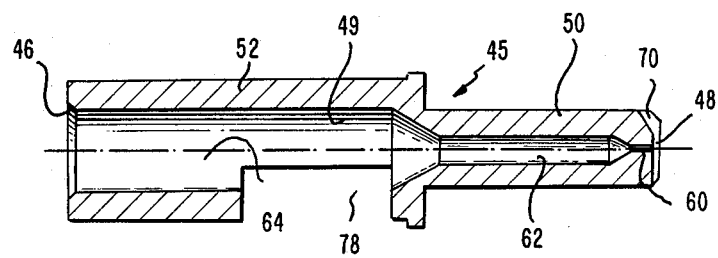
FIGS. 5 and 6 are longitudinal sectional and front end views respectively of the ferrule of the connector of the present invention.

Housing 20 accommodates in bores 26a, 26b a pair of fiber accommodating ferrules 45. Shown in greater detail in FIGS. 5 and 6, ferrule 45 is an elongate substantially cylindrical member having a cable receiving end 46 and a fiber egressing end 48 and a central bore 49 therethrough. Ferrule 45 has a narrow front section 50 adjacent egressing end 48 and a wider rear section 52 adjacent receiving end 46. As shown in FIGS. 2 and 3 front section 50 extends outwardly of egressing portion 24 of housing 20.

Central bore 49 of ferrule 45 has a first fiber engaging bore extent 60 which is closely dimensioned to the diameter of fiber 16 to positionally retain the fiber 16 therein. A second more rearward and wider bore extent 62 extends through front section 50 of ferrule 45 to allow unrestricted passage of fiber 45. A third bore extent 64 which is rearward and wider than second extent 62 accommodates the fiber 16 and the end of jacket 17 from which fiber 16 extends.

The forward portion of ferrule 45 adjacent egressing end 48 includes a longitudinal slot 70 which extends from the outer cylindrical surface of front section 50 through and slightly radially beyond bore extent 60 and is in communication therewith. Shown in greater detail in FIGS. 6 and 7, slot 70 extends axially inwardly from egressing end 48, and is substantially rectangular in front view (FIG. 6), cutting an accurate segment of about 60° around the circular perimeter of egressing end 48. The slot 70 tapers upwardly and outwardly along the longitudinal extent of ferrule 45 (FIG. 7) to form a wedge-shaped upper extent 72 which accommodates a wedge-shaped cleaving element 75 as will be described hereinafter.

Figure 6:
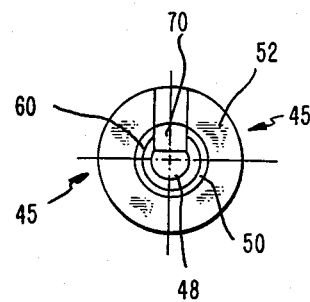
Figure 7:
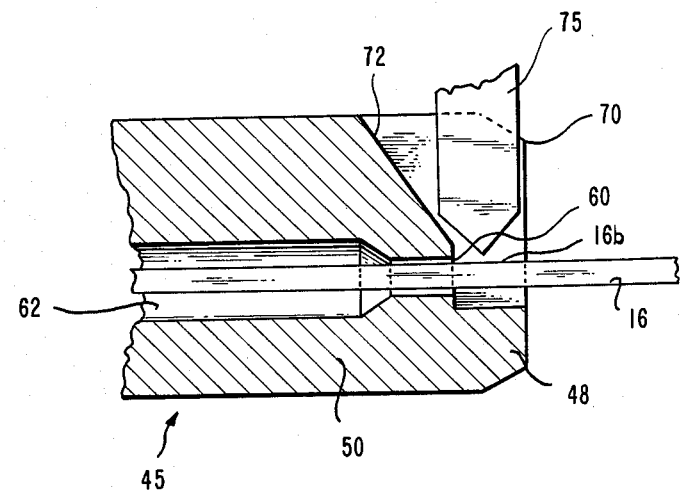
FIG. 7 is an enlarged view of the fiber egressing end of the ferrule of FIG. 5 with a cleaving element shown schematically.

In cleaving an optical fiber 16, one typical and efficient method is to nick or score the fiber with a diamond blade which is brought down perpendicularly to contact the fiber. The fiber 16 may be severed at this point by pulling the excess extent therefrom. As above-mentioned, it is desirous, when cleaving a fiber in a housing such as a connector or ferrule, to cleave inwardly of the end of the connector such that the severed surface forming the fiber end face will be positioned internally of the end thereof. As shown in FIG. 7 the ferrule 45 of the present invention provides clearance by way of slot 70 for a cleaving element 75 which can be brought down perpendicularly relative to the fiber axis to nick fiber 16 a a point 16b which is inwardly of egressing end 48 of ferrule 45. In this particularly described embodiment as seen in FIG. 6, the cleaved end face 16b of fiber 16 will be protected by the egressing end 48 of ferrule 45 which extends for approximately 300° therearound.

Referring again to FIG. 5 ferrule 45 also includes an externally accessible central cavity 78 extending through rear section 52 in communication with rear bore extent 49. Central cavity 78 is alignable with a receiving well 80 in the undersurface of housing 20 (FIG. 3). Well 80 and central cavity 78 receive an adhesive material 82 which surrounds the fiber 16 when in place in ferrule 45. The adhesive material which may be a one or two-part adhesive, secures the fiber in fixed position in ferrule 45 upon curing. The well 80 is constructed to permit entry of sufficient amount of adhesive material 80 to secure fiber 16 to ferrule 45. A cover 84 slidably closes well 80 preventing excess adhesive leakage. One type of adhesive which may be employed in an anaerobic adhesive sold by Loctite Corp. under the trademark "Speedbonder 326" which cures in the absence of air. When employing this anaerobic adhesive, the fiber is normally moved back and forth in the ferrule after applying the adhesive 82. Thus the fiber 16 will be coated with adhesive 82 along the extent of fiber accommodated by first bore extent 60. As this bore extent 60 is closely dimensioned to the diameter of fiber 16, it will substantially exclude all air therebetween allowing the adhesive to set up. While adhesive securement is shown as a preferred way of securing the fiber 16 to ferrule 45, other securement techniques such as fiber clamps may also be employed. Once the fiber 16 is secured to ferrule 45 the fiber may be cleaved in the ferrule as above described.

As shown in FIGS. 1 and 2 the male plug 12 also includes a shuttering mechanism 90 which is attachedly secured to the front end 24 of housing 20. Shutter mechanism 90 encloses the extending portions 50 of ferrules 45. The egressing end 48 of ferrule 45 and thus the cleaved end 16b of fiber 16 can be alternately opened and closed upon interconnection with female receptacle 14. The slide 91 of shuttering mechanism, normally biased in a closed position, is responsive to interconnection with receptable 14 to open, exposing the fiber end 16b. A shuttering mechanism such as shown herein is more fully described, for example, in co-pending commonly assigned U.S. patent application Ser. No. 657,908 filed Oct. 5, 1984.

Figure 4:
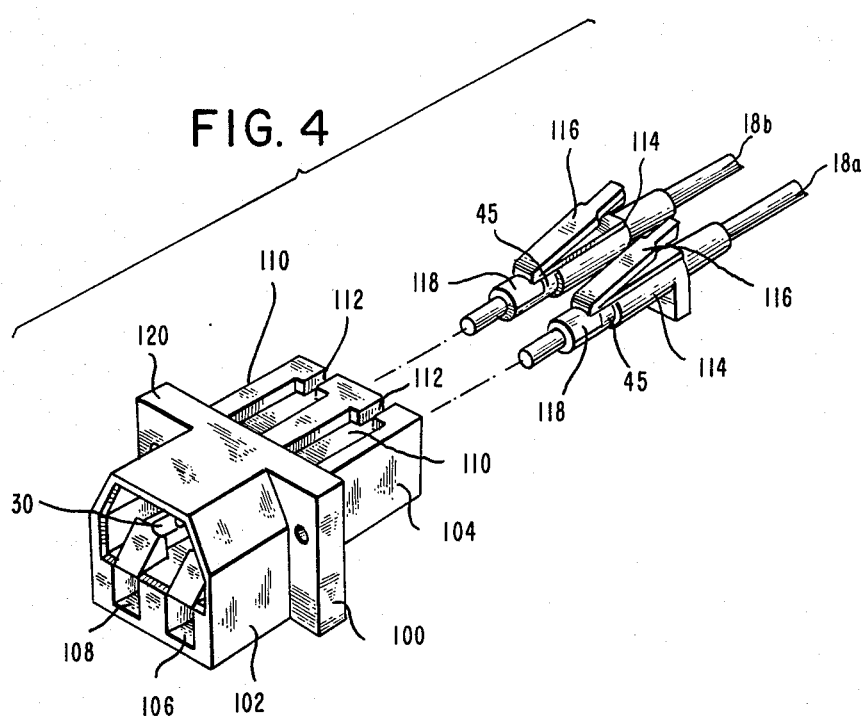
FIG. 4 shows the receptacle of FIG. 1 with the optical fiber ferrules shown removed therefrom.

Referring now to FIGS. 1 and 4 the female receptacle 14 is shown comprising body 100, having a forward portion 102 for receipt of plug member 12 and a rearward portion 104 for receipt of a pair of fiber optic cables 18a and 18b. The forward portion 102 includes a mating bayonet connection 30, as above described, for coupling mating plug 12 with receptacle 14. A pair of movably biased shutters 106 and 108 adjacent bayonet connection 30 are engageable with shuttering mechanism 90 of plug 12 to provide a shutter to the fiber mounted in receptacle 14. Upon connection of plug 12 to receptacle 14 the shutters 106, 108 of receptacle 14 as well as the shuttering mechanism of plug 12 will open to expose the fibers for light transmission therebetween as described in the aforementioned U S. patent application. Rear portion 104 of receptable 14 is an elongate member having a pair of side-by-side channels 110 which removably accommodate ferrules 45.

As previously described, plug 12 fixedly supports ferrules 45 in housing 20. Duplex cable 17 is inserted into the housing end 22 and the pair of fibers 16 extend through egressing end 24. The fibers 16 are terminated and cleaved in the housing 20 itself. In contrast, as receptacle 14 accommodates a pair of single cables 17, each cable can be terminated and cleaved in ferrule 45 apart from receptacle 14. Receptacle 14 includes a pair of contact members 114 each of which receives and supports a ferrule 45. The ferrule is supported in elongate contact member 114 at the rear end thereof thus exposing forward portion 50 and central cavity 78. The prepared cable 17 having an extending fiber (not shown) is inserted into the supported ferrule 45. The fiber may now be adhesively secured in the ferrule as above described. A cavity cover 118 is provided for each ferrule to close cavity 78 after the adhesive 82 is applied. After adhesively securing the fiber in ferrule 45, the fiber can be cleaved as described above. The terminated fiber secured in ferrule 45 and supported by contact member 114 is inserted into channels 110 of receptable 14. A cantilever spring clip 116 snaps into a corresponding slot 112 in channel 110 to removably secure contact member 114 in receptacle 14. Additionally, ferrule 45 may being biasingly supported in contact member 114 for movement longitudinally therein. Once placed in receptacle 14, a biased ferrule 45 can be moved further into contact member 114. Upon connection of plug 12, the aligned ferrules 45 of plug 12 will contact ferrules 45 of receptacle 14, the latter will be movable against the bias, provided for example by springs (not shown) supporting the ferrules 45 in contact members 114. This movement will assure end-to-end contact of the connected ferrules 45, thus placing the fiber end faces 16b in close proximity.

Between forward portion 102 and rear portion 104, receptacles 14 includes a mounting surface 120. In typical installation, receptacle 14 is mounted or secured to an apparatus (not shown) to which fiber optic connection is to be made. The receptacle 14 can be mounted to the apparatus by use of mounting surface 120. Once securely mounted, the plug 12 can be inserted and locked into connection with receptacle 14.

Having described the preferred embodiments and practices of the present invention which are intended to be illustrative and not limiting, the true scope of the present invention is set forth in the following claims.

I claim:

1. A method of cleaving an elongate optical fiber comprising the steps of:
   providing an elongate ferrule having a fiber receiving end, a fiber egressing end, an outer peripheral surface and a longitudinal fiber bore between said ends, said ferrule including a slot through said outer peripheral surface adjacent said fiber egressing end and in communication with said fiber bore;
   disposing said fiber in said fiber bore, said fiber having an end thereof extending beyond said fiber egressing end of said ferrule; and
   moving a fiber scoring element into said slot of said ferrule and into contact with said fiber to score said fiber at a fiber location spaced inwardly of said fiber egressing end of said ferrule.

2. A method in accordance with claim 1 wherein said disposing step includes:
   securing said fiber in said ferrule.

3. A method in accordance with claim 2 wherein said securing step includes:
   adhesively securing said fiber in said ferrule.

4. A method in accordance with claim 1 wherein said fiber is a glass fiber.

5. A method of cleaving an elongate optical fiber having a central fiber axis, comprising the steps of:
   providing an elongate ferrule having a fiber receiving end, a fiber egressing end, an outer peripheral surface and a longitudinal fiber bore between said ends, said ferrule including a slot through said outer peripheral surface adjacent said fiber egressing end and in communication with said fiber bore;
   disposing said fiber in said fiber bore, said fiber having an end thereof extending beyond said fiber egressing end of said ferrule; and
   moving a fiber scoring element in a direction perpendicular to said fiber axis to score said fiber through said slot at a fiber location spaced inwardly of said fiber egressing end of said ferrule.

* * * * *